July 13, 1943.　　　　L. HOLMES　　　　2,324,083
METHOD OF MAKING BEARINGS
Filed Feb. 27, 1940　　　　2 Sheets-Sheet 2
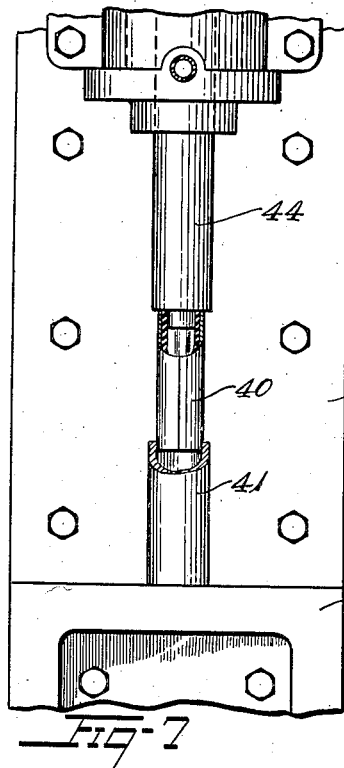
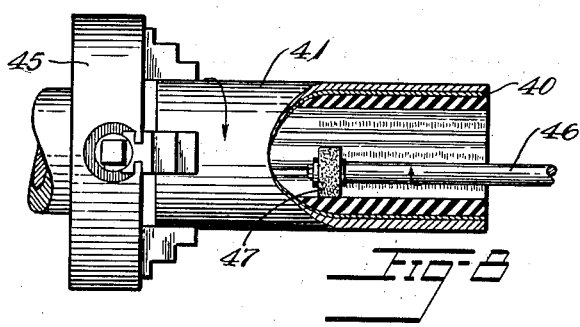
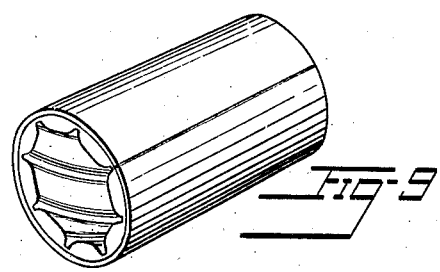
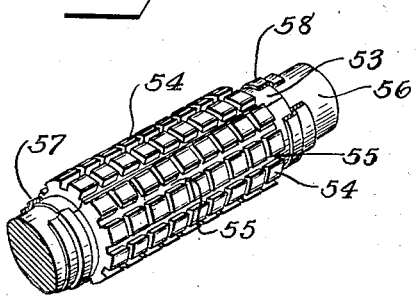
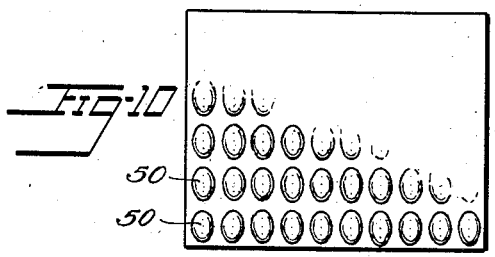
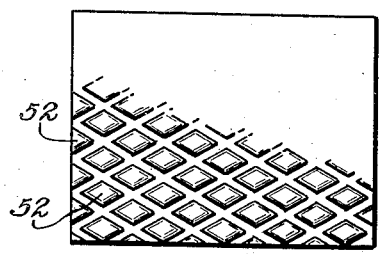
Inventor
Lenis Holmes Patented July 13, 1943

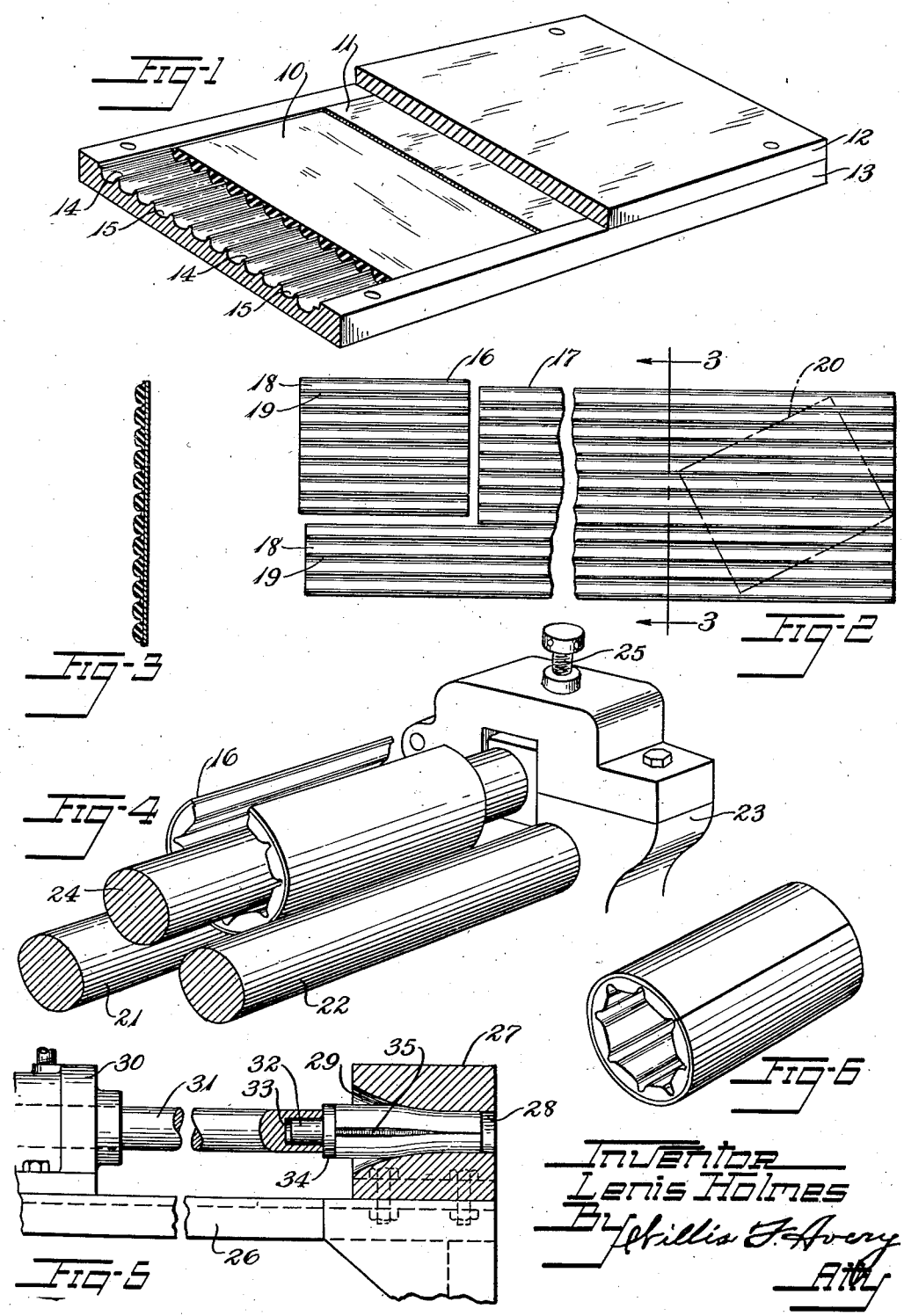

2,324,083

UNITED STATES PATENT OFFICE 2,324,083

METHOD OF MAKING BEARINGS

Lenis Holmes, Medina, Ohio, assignor to The B. F. Goodrich Company, New York, N. Y., a corporation of New York Application February 27, 1940, Serial No. 321,059

1 Claim. (Cl. 29—149.5)

This invention relates to bearing structures and to methods of making the same and is especially useful in relation to bearing structures having a resilient bearing surface adapted to be lubricated by water or other lubricant.

Heretofore bearings of the water lubricated type have usually been constructed by molding a resilient rubber-like facing into bonded relation to a cylindrical metallic supporting structure such as a shaft or metal bushing. Such a procedure has been expensive where only a small quantity of bearings of a certain size were required, and has lacked flexibility of procedure because of the great variety of molds of different dimensions and sizes required and the losses of time consumed in changing molds. Such molds are expensive and the production of molds to satisfy special requirements consumes time.

Furthermore, while it has been proposed to form the resilient bearing surface with bearing lands separated by lubrication grooves in various arrangements, some of which arrangements having advantages from a bearing operating standpoint, such as helically disposed grooves and lands, such arrangements have been very difficult or impossible to mold successfully due to difficulty in removing cores from the finished article.

Difficulties in the molding of such articles have also been encountered in that it is difficult to provide a satisfactory bond between the rubber-like material and the inner cylindrical surface of the backing layer. This is no doubt due to the fact that such bearings usually have been formed by applying pressure endwise thereof resulting in dragging of the rubber material over the surface to which it is to be bonded, a situation which has often resulted in a poor bond, and the direction of pressure has not been normal to the surfaces to be bonded together. As the length of the bearing is increased these difficulties become greater.

The principal objects of the present invention are to make possible the manufacture of bearing surfaces, especially molded bearing surfaces, having lands and grooves of any desired shape, to provide facing units that can be adapted to bearings of a variety of sizes, to provide a strong bond between the bearing material and its backing, to provide an improved bearing, and to provide for economy and convenience of manufacture.

These and other objects will appear from the following description and the accompanying drawings.

Of the drawings,

Fig. 1 is a perspective view of a mold with a sheet of formed material therein illustrating a step in the procedure of the invention, part of the mold and the sheet being broken away.

Fig. 2 is a plan view of the sheet material produced from the mold of Fig. 1 with one portion cut from the sheet and indicating in dot and dash lines where another portion may be cut therefrom.

Fig. 3 is a cross-sectional view taken on line 3—3 of Fig. 2.

Fig. 4 is a perspective view of a set of bending rolls with a partially formed sheet of material therein, parts of the machine being broken away.

Fig. 5 is a view, partially broken away and sectioned, of a press for closing in the formed sheet of material to tubular form, a partially formed bearing being shown therein, parts of the press being broken away.

Fig. 6 is a perspective view of a bushing made by the method illustrated in Figs. 1 to 5.

Fig. 7 is a view of a press showing the bushing of Fig. 6 being forced into a retaining sleeve, parts of the bushing and the sleeve being broken away and parts shown in section.

Fig. 8 is an elevation of the assembled bearing in apparatus for grinding the bearing face of the bearing, parts being broken away and sectioned.

Fig. 9 is a perspective view similar to Fig. 6 but showing a bushing having helical bearing lands and lubricant grooves.

Fig. 10 is a plan view of a sheet of bearing material having spaced bearing lands of round or oval shape.

Fig. 11 is a similar view of a bearing sheet having rectangular lands.

Fig. 12 is a similar view of a bearing sheet having lozenge-shaped lands.

Fig. 13 is a perspective view of a shaft having a bearing face of sheet material applied thereto, a portion of the retaining bands being broken away and in section to show their construction.

Referring to the drawings, the invention contemplates the forming of a sheet of material in flat form, or generally flat form, with a bearing surface on one face thereof, and the forming of the flat sheet to a different shape to provide a generally curved bearing surface on one of its faces. In the preferred form of the invention, the sheet material is bent to provide a bushing of bearing material having a substantially cylindrical bearing surface on either its inner or outer circumference, but bearings of segmental form may be provided.

In proceeding according to the invention a layer 10 of bearing material, such as unvulcanized rubber composition or other rubber-like material, and a layer 11 of backing material such as sheet metal or other stiff bendable material are assembled face to face in substantially flat form between mold plates 12, 13 and heat and pressure are applied thereto. The mold plate 12 is formed with raised rib portions 14 separated by depressions 15 for forming lubricant grooves and bearing lands respectively in the face of the compound sheet of material. During the application of heat and pressure the bearing material is vulcanized and formed to conform to the mold plate and the rubber composition is vulcanized or adhered preferably in bonding relation to the sheet of backing material. When the backing material is of metal to which rubber compositions will not adhere, the metal may be electroplated with brass or other metal to which rubber may be adhered or the metal may be treated with other materials such as cements to promote adhesion.

The composite sheet of bearing material may be made of such size as to form a single bearing or a large sheet of material may be formed in a single operation and then cut to provide portions suitable for forming single bearings as in Fig. 2 where a portion 15 suitable for a single bearing has been cut from a sheet 17. In the example shown in Fig. 2 the sheet 17 has longitudinal bearing lands 18 separated by lubricant grooves 19 and the sheet 16 has been prepared with lands and grooves running longitudinally thereof. Where it is desired to provide helical grooves in the finished bearing member, a portion 20 may be cut from the sheet 17 at any desired angle with respect to the lands and grooves. The provision for cutting the bearing facings from large sheet material has the further advantage of accommodating bearings of a variety of sizes from the same molded sheet material, thus saving mold and handling expense and increasing convenience.

The sheet 16 may then be bent to arcuate form in any desired manner, as by passing it between bending rolls, as illustrated in Fig. 4, where rolls 21, 22 are rotatably mounted in a housing 23 in spaced relation and a third roll 24 is adjustable toward the bite of the rolls 21, 22 by means of screws such as 25. The sheet may be fed between the rolls while roll 25 is adjusted toward rolls 21, 22 to provide the proper curvature. Objectionable crowding of the resilient bearing material at the inside during the bending is avoided, even with a thick facing of the material, owing to the presence of the grooves. Some crowding of the material is beneficial because compression increases the resistance of rubber to abrasion.

Where the bearing is to have its rubber bearing surface on the inside thereof, as in Fig. 6, the rubber surface is turned toward the roll 24 during the bending operation and where the bearing surface is to be on the outside as in Fig. 13, the metal surface is turned toward the roll 24 during the bending operation. Here the presence of the grooves has the result of avoiding tension at the bearing surface, which tension might weaken the material in its resistance to abrasion.

Further forming and sizing of the bearing may be accomplished by forcing the bearing through a die, as illustrated in Fig. 5, where the numeral 26 designates the frame of a press to which is fastened a die 27 having a bore 28 of the desired size and a bell mouth 29 communicating therewith. A pressure-fluid operated cylinder 30 is also fixed to the frame and has a piston or ram 31 in alignment with the die. A mandrel 32 may be removably mounted in a socket 33 of the ram and has a flange 34 adapted to engage the end of the bushing to distribute the pressure evenly thereto and may have a portion 35 adapted to enter the bushing to hold it and to prevent its being closed too far. Fluid pressure means (not shown) are provided for actuating the ram, or any other power operated device may be used for reciprocating it. The bushing is placed on the mandrel and forced through the die. The mandrel and the resilient bearing material force the metal backing into intimate contact with the die so that the finished bushing is accurately cylindrical.

To provide for holding the split bushing 40 permanently in cylindrical shape, it may then be pressed into a retaining bushing 41 as shown in Fig. 7 where 42 is the frame, 43 the table, and 44 the ram of a hydraulic press. The bushing 41 is seamless and is a press fit for the bushing 40.

Where great accuracy is required, the bushing 41 with the bushing 40 assembled therein may be accurately centered from its outer face in the chuck 45 of a grinding machine and the bearing surface may be ground true, an internal grinding spindle 46 carrying a rotatable grinding wheel 47 being reciprocated through the bore of the bushing as the bushing is rotated by the chuck.

As the bearing surface is molded in sheet form, any desired arrangement of lands and grooves may be provided. Figs. 10 to 12 illustrate a few of the many forms of bearing surface which may be produced, Fig. 10 showing lands 50 in the form of round or oval buttons, Fig. 11 showing lands 51 in the form of tiers of parallel bars, and Fig. 12 showing lands 52 of lozenge or diamond form. A great variety of land and groove configuration is made possible by the forming of the bearing surface in flat sheet form, without encountering the difficulty that has existed heretofore in removing a molding core from the bearing while avoiding injury to the configuration.

The split bushing may be marketed as a complete bearing which may be pressed into an aperture provided therefor in the machine part or the split bushing may be assembled in the continuous sleeve and marketed for use in that way. The outer sleeve may be permanently secured to the split bearing in any desired manner if desired.

In the bearing illustrated in Fig. 13, the sheet material has been bent so as to provide a supporting layer 53 of cylindrical form on the inside and lands 54 separated by lubricant grooves 55 on the outside thereof. Such a split sleeve may be placed about a shaft 56 to provide a bearing surface thereabout, and may be held in place in any desired manner as by annular collars 57, 58 forced over exposed margins of the backing layer and over the shaft. In the bearing illustrated in this figure the lands 54 are rectangular and arranged in circumferentially and axially disposed rows.

Where helical lands and grooves are desired, the angle at which the sheet portion 20 is cut from the sheet 17 (Fig. 2) may be mathematically determined for a bearing of certain circumference so that the ends of the lands and grooves match properly at the seam.

Variations may be made without departing from the scope of the invention as it is defined by the following claim.

I claim:

The method of making a bearing structure which comprises molding a layer of vulcanizable rubber-like material to provide lubricant grooves in a face thereof extending in one direction of the layer while bonding the material to a layer of stiffly bendable backing material, cutting a portion from said layer extending diagonally of said grooves, and bending said portion arcuately to provide a cylindrical bushing having lubricant grooves extending helically thereof.

LENIS HOLMES.